Feb. 10, 1970 S. L. WIIG 3,494,525

MULTITRACK TAPE RECORDER WITH AUTOMATIC TRACK SWITCHING

Filed April 18, 1968

TAPE IN FIRST TRACK

TAPE SHIFTED TO 2nd. TRACK

Inventor
Selmer L. Wiig
By James J. Jennings, Jr.
Attorney 3,494,525

MULTITRACK TAPE RECORDER WITH AUTOMATIC TRACK SWITCHING

Selmer L. Wiig, Walnut, Calif., assignor to Borg-Warner Corporation, Chicago, Ill., a corporation of Delaware Filed Apr. 18, 1968, Ser. No. 722,282
Int. Cl. B65h *25/26*
U.S. Cl. 226—11 10 Claims

ABSTRACT OF THE DISCLOSURE

A multitrack tape recorder has a guide chute with walls spaced apart by a distance greater than the tape width. A pair of canted rollers are journalled for rotation with their surfaces engaging the tape, and their surfaces are aligned at an angle relative to the direction of longitudinal tape movement. This alignment causes the tape to bear against one wall of the guide chute when the tape is displaced in a given direction, and shifts the tape laterally to a different track as the tape direction is reversed to bear against the opposite wall of the tape guide chute.

BACKGROUND OF THE INVENTION

The field of data acquisition frequently utilizes tape recorders of the type wherein data is stored on a length of tape as the tape is pulled off a supply reel and wound on a take-up reel. The amount of information that can be stored is a function of the geometry of the system, including tape length and tape width. By making the tape slightly wider and shifting the tape laterally as the tape direction is reversed, so that information is initially stored along a first track (or a plurality of spaced-apart first tracks) on the tape, and thereafter deposited on a second track spaced from the first (or a plurality of second tracks interleaved with the first tracks) when the tape is reversed, the information storage capability can be doubled. However, this lateral offset or track switching has conventionally utilized some mechanism for shifting the tape laterally from one track to another as the longitudinal tape direction is reversed. Generally such mechanisms have included moving parts such as a solenoid actuated by a signal from an end-of-tape sensor to mechanically displace a tape guide component. Because data acquisition tape recorders are frequently used to monitor rocket launches, satellite performance and other events with severe environmental conditions, the movable mechanisms for laterally shifting the tape have not proved entirely suitable. It is therefore a salient consideration of the present invention to provide an automatic mechanism for laterally shifting the tape from one track to another, and more particularly to do so without the displacement of any parts such as a solenoid actuator, mechanical tape guide, and so forth.

SUMMARY OF THE INVENTION

A reversible tape drive system constructed in accordance with the inventive teaching effectively displaces a tape along one track in a given direction and, when the longitudinal tape direction is reversed, displaces the tape along a second track laterally offset from the first. A guide means, including first and second spaced apart wall portions, is provided to limit the extent of lateral tape offset as the tape direction is reversed. A drive capstan is positioned adjacent the tape path to engage the tape and effect longitudinal tape displacement as a motor mechanically coupled, by a belt or similar means, to the capstan is energized. Electrical connections are provided to reverse the direction of motor drive and thus reverse the direction of tape displacement. A roller assembly is provided for effecting lateral tape shifting between the first and second tracks automatically each time the direction of longitudinal tape travel is reversed. The assembly includes a roller journalled adjacent the tape path such that the roller surface engages the tape, and the roller surface is aligned at an acute angle relative to the path of tape travel. This angular positioning of the roller effectively displaces the web laterally and maintains it in one track as the web is driven in a first direction, and displaces the tape laterally in the opposite direction as the longitudinal tape movement is reversed so that the tape rides in the second track. This is accomplished without any shifting of the roller as the tape direction is reversed; the only movement of the roller is its rotation around its own axis.

THE DRAWING

The features of the present invention which are believed to be novel are set forth with particularity in the appended claims. The organization and manner of operation of the invention may best be understood by reference to the following description taken in connection with the accompanying drawing, in the several figures of which like reference numerals identify like elements, and in which:

General description of the invention

Figure 1:
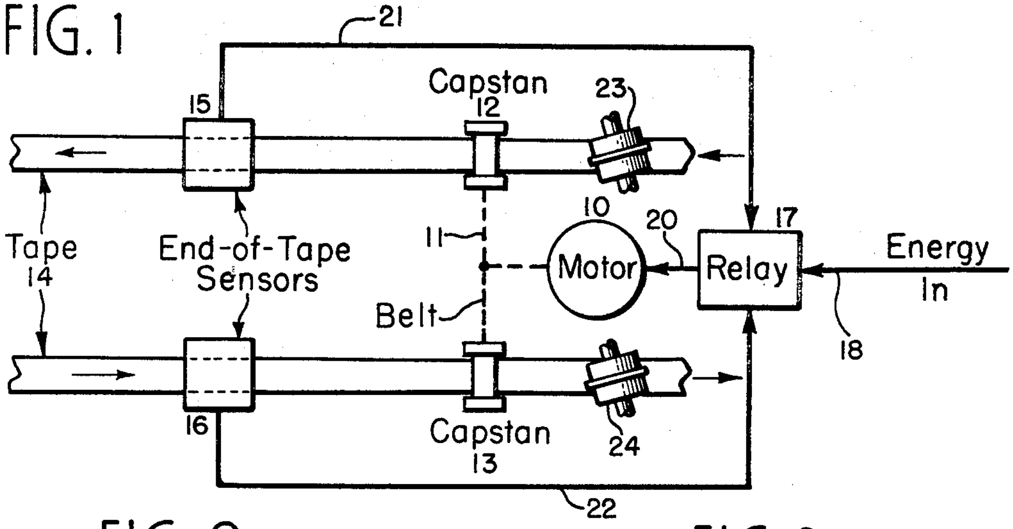
FIGURE 1 is a block diagram of a tape recorder system constructed and operated in accordance with the inventive teaching.

Shown in FIGURE 1 is a drive system for a tape recorder. "Recorder" as used herein and in the appended claims describes a system for translating electrical signals into magnetic signals stored on a magnetizable tape, commonly termed a magnetic tape, and/or for utilizing the stored magnetic signals to reproduce electrical or other signals indicative of the stored information. The illustrated system includes a motor 10 mechanically coupled over a belt 11 to a pair of drive capstans 12, 13. A magnetic tape 14 is shown in its path of longitudinal movement past a first end-of-tape sensor 15 and capstan 12 and, after passing the other capstan roller 13, past another end-of-tape sensor 16. The supply and take-up reels, the heads, and other conventional components are not shown in this general layout, because such items are well known and understood by those skilled in the art. A switching means 17, which may be a conventional latching relay, is connected to pass electrical energy received over an input line 18 through the relay connections and over line 20 to motor 10. The sense of the energy (for example, the polarity of a D-C voltage or phase sequence of an A-C voltage) passed from the relay 17 to the motor 10 is reversed in response to receipt of a control signal over line 21 from sensor 15, and is also reversed in response to receipt of a control signal over line 22 from end-of-tape sensor 16. Each reversal of motor energization effects a reversal in the direction of motor rotation and, over belt 11, reverses the direction of rotation of both capstans 12, 13, thus reversing the longitudinal direction of tape travel.

In accordance with the present invention a pair of canted roller assemblies 23, 24 are separately positioned to engage the tape and, because each roller surface is aligned at an angle with respect to the direction of tape travel, the rollers automatically effect and maintain a lateral offset of the tape between first and second tracks each time the longitudinal direction of tape travel is reversed.

DETAILED DESCRIPTION OF THE INVENTION

Figure 2:
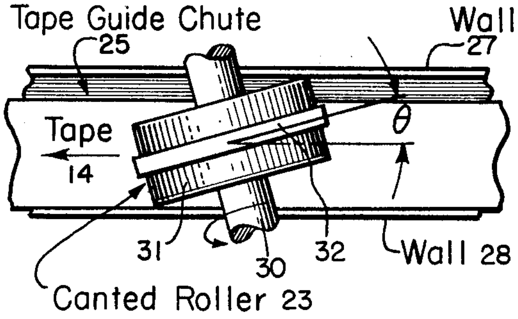
FIGURES 2 and 3 are illustrative showings, on a scale enlarged with respect to that of FIGURE 1, useful in understanding the invention.

FIGURE 2 indicates one of the roller assemblies 23 on a scale enlarged with respect to that of FIGURE 1. As there shown the tape 14 is moving along a path from right to left, and is restrained in the extent of lateral offset, or aligned in the proper track, by a tape guide chute 25. Such a guide unit in the illustrated embodiment comprises a generally U-shaped member with a base portion 26 from which a pair of walls 27, 28, extend at substantially right angles relative to base 26. Those skilled in the art will appreciate that other types of guide arrangements can be used, and the two walls or restraining portions need not be affixed to a common base but can be anchored to other portions of the tape recorder in which this system is incorporated. For example the top and bottom covers of the tape recorder may provide the desired guide unit. Likewise the tape guide chute 25 need not be located at the same point along the tape path at which roller 23 is positioned but the roller in assembly 23 can contact the tape at a point displaced from the location of the tape guide chute.

Particularly in accordance with this invention, assembly 23 includes a canted roller 31 mounted for rotation about its axial pin 30, which pin is aligned at an angle slightly offset from a line normal to the path of tape travel. Roller 31 has an annular surface on which a rib or raised portion 32 is provided. If the roller surface or the rib 32 were unrolled about the axial pin 30 it would extend along a center line indicated by the dash-dot line to define an angle $\theta$ relative to the path of tape travel. The terms "path," "travel" and "displacement," as used herein and in the appended claims refer to the longitudinal movement of the tape. Thus "path" describes the longitudinal tape displacement where the tape 14 abuts wall 27 or wall 28.

The raised portion 32, which has a surface area much less than the surface area of the roller 31, is provided to reduce the area of frictional engagement with the tape 14 but the benefits of the invention can be obtained without the provision of a rib 32. That is, without the rib as the tape moves from right to left as indicated in FIGURE 2, the surface of roller 31 bears against the tape and urges it downwardly to ride in the indicated position, termed the "first track" for purposes of explanation. The same action would occur with the raised surface or with rib 32, although the frictional wear on the tape would be significantly decreased by utilizing the rib.

Figure 3:
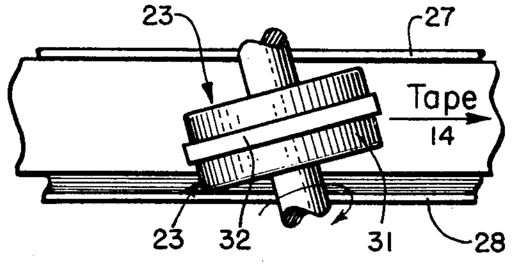

In accordance with the inventive teaching, as the direction of tape travel is reversed (FIG. 3) the roller 31 is rotated in the opposite direction by the tape movement and provides an offset movement which urges the tape to the second track, where the upper edge of tape 14 abuts wall 27. It is emphasized that this lateral tape offset from one track to the other is obtained automatically and almost instantaneously with reversal of tape travel. There is no movement of the guide roller assembly 23, or any part of the assembly away from its fixed position, nor any displacement of a solenoid or other switching mechanism as has been conventionally utilized in this art to effect shifting of the tape between different tracks.

Figure 4:
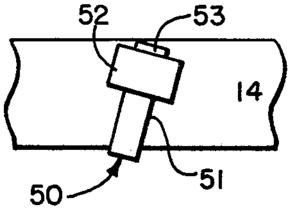
FIGURE 4 is an illustrative showing of a preferred embodiment of the invention.

FIGURE 4 depicts a preferred embodiment of the canted guide roller. Roller assembly 50 includes a support shaft 51, which may be affixed by any suitable means to an adjacent bracket or wall. A roller bearing 52 is secured by a fastener 53, which may be a screw, to the top ofshaft 51. Bearing 52 is aligned at the same angle with respect to the path of tape 14, and thus offsets the tape laterally from one track to another as the direction of tape travel is reversed. It is evident that the rib or bearing portion of the guide roller assembly neea not be centered on the roller surface, but may be at one end or some other location.

Figure 5:
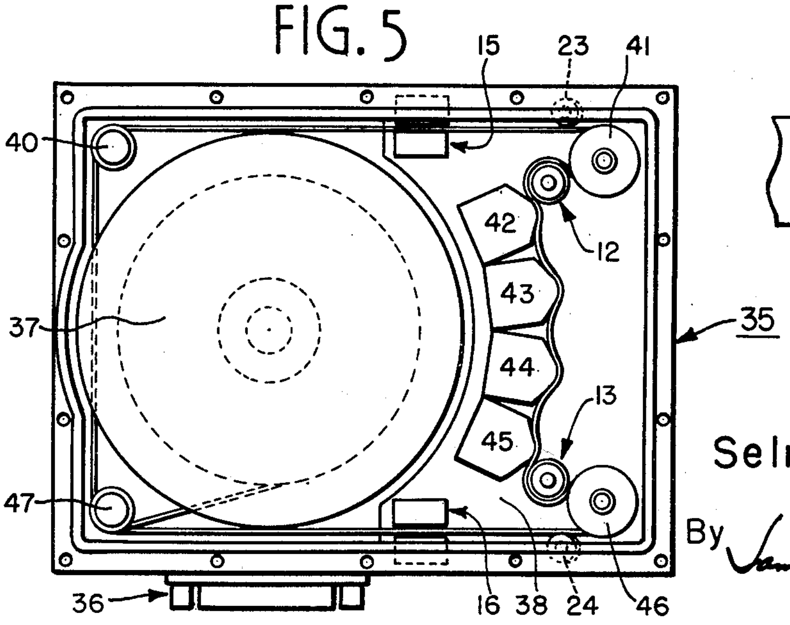
FIGURE 5 is a plan view of a preferred embodiment for incorporating the structure of this invention in a tape recorder system.

FIGURE 5 illustrates the relative physical positions of the novel and unobvious canted guide roller assemblies in conjunction with a tape recorder drive arrangement. The recorder includes a casing 35 having a receptacle 36 on one side thereof including a plurality of individual connections (not shown) for both receiving input energy and input signals and for returning output singals. The top cover 37 of one reel is visible and the other reel (not visible) is disposed beneath the top reel. Neither the motor nor the belt depicted generally in FIGURE 1 is visible in FIGURE 5, both being positioned beneath the deck 38. Tape is passed from the supply reel along a path that includes a first guide roller 47, a second guide roller 40, end-of-tape sensor 15, canted offset roller assembly 23, a second guide roller 41, capstan 12, erase head 42, record head 43, erase head 44, reproduce head 45, capstan 13, a third guide roller 46, end-of-tape sensor 16, and around guide rollers 47 and 40 back to the take-up reel. As the amount of tape on the supply reel decreases to a point where it is almost exhausted, end-of-tape sensor 15 detects this condition by any of the well known magnetic, optical or mechanical means. Upon sensing this condition a control signal is passed over line 21 (FIG. 1) to the switching unit 17 to reverse the polarity or phase of the energy passed over line 20 to motor 10, reversing the direction of longitudinal tape displacement. Concomitantly with the reversal of tape travel the tape is displaced vertically from the position shown in FIGURE 2 to that illustrated in FIGURE 3, or vice versa, without any additional provision of control signals or operations of switching mechanisms to displace the tape between adjacent tracks.

The embodiments of the invention in which an exclusive property or privilege is claimed are defined as follows:

1. A drive system for a tape recorder in which the tape is displaceable in a given direction along a first track and is reversible to travel in the opposite direction along a second track laterally offset from the first track, comprising:

- guide means, including first and second spaced apart wall portions, for limiting the extent of lateral tape offset as the direction of tape travel is reversed,
- a drive capstan positioned adjacent the tape path to engage and displace the tape longitudinally,
- a motor mechanically coupled to said drive capstan to effect tape displacement as said motor is driven, and electrically connected to reverse the direction of motor drive and thus reverse the direction of tape displacement, and
- a roller assembly for effecting lateral shifting of the tape between said first and second tracks each time the direction of tape travel is reversed, which assembly includes a roller journalled adjacent the tape path such that the roller surface is aligned at an acute angle with respect to the longitudinal direction of tape travel, which roller surface engages the tape and urges the tape laterally into said first track as the tape is driven in said given direction and urges the tape laterally in the opposite direction into said second track as the tape is driven in a direction opposite said given direction.

2. A drive system as claimed in claim 1 in which said roller assembly comprises a support shaft, and said roller is a roller bearing mounted on said shaft to provide said roller surface.

3. A drive system as claimed in claim 1 in which said roller assembly also comprises an annular rib extending outwardly from said roller surface, thus reducing the area over which the roller contacts the tape and correspondingly reducing the amount of frictional wear on the tape.

4. A drive system as claimed in claim 1 and further comprising switching means, coupled between an energy input circuit and said motor, which switching means operates to reverse the sense of motor energization and thus reverse the motor rotation to drive the tape in the opposite direction.

5. A drive system as claimed in claim 4 and further comprising a pair of end-of-tape sensors, connected to sense the end-of-tape condition and to pass a control signal to said switching means to reverse the sense of motor energization and thus reverse the direction of tape displacement each time said end-of-tape condition is sensed.

6. A reversible drive system for a magnetic tape recorder in which a tape of predetermined width is displaceable in a given direction along a first tape track and is also displaceable in a direction opposite said given direction along a second tape track which is spaced laterally from said first tape track, comprising:

a reversible drive motor, at least one capstan, positioned to engage the tape, and coupled to said motor to effect longitudinal tape displacement responsive to rotation of said motor, switching means connected to pass electrical engergy to said motor and to reverse the sense of motor energization, responsive to receipt of a control signal, to reverse the motor rotation and thus reverse the direction of tape displacement, a pair of end-of-tape sensors, spaced apart and positioned adjacent different portions of the tape path, such that each of said sensors passes a control signal to said switching means when the tape is nearly exhausted, a tape guide chute having a pair of wall portions for restraining lateral tape movement, which wall portions are spaced apart by a distance substantially equal to said predetermined tape width plus the distance between said first and second tape tracks, and a canted roller disposed adjacent the tape path and positioned such that the roller surface engages the tape as the tape is longitudinally displaced, said roller surface being canted at an angle with respect to the direction of longitudinal tape movement such that the tape is held adjacent one wall portion of the tape guide chute as the tape is moved in a first longitudinal direction, and the tape is laterally displaced against the other wall portion of the tape guide chute when the tape is displaced in the opposite longitudinal direction, to effect automatic tape shifting between tracks by the canted roller.

7. A reversible drive roller as claimed in claim 6 in which said canted roller is a roller bearing, a support shaft is provided, and a fastener secures the roller bearing to the support shaft.

8. A reversible drive system as claimed in claim 6 in which said canted roller includes an annular rib extending outwardly from said roller surface, to provide a minimum area of frictional contact with the moving tape and thus minimize the amount of tape wear.

9. A reversible drive system as claimed in claim 6 and further comprising at least one head disposed adjacent the tape path at an operating location, said canted roller being disposed to one side of said operating location, and a second canted roller, positioned to the other side of said operating location and disposed adjacent the tape path and positioned such that the second roller surface engages the tape as it is displaced, said second roller surface being canted in the same sense as the first roller surface at an angle with respect to the direction of longitudinal tape movement, such that said canted rollers cooperate to effect and maintain the lateral tape offset as the direction of tape movement is reversed.

10. A reversible drive system for a magnetic tape recorder in which a tape of predetermined width is displaceable in a given direction along a predetermined tape track and also displaceable in a direction opposite said given direction along a second tape track which is spaced laterally from said first tape track, comprising:

a reversible drive motor, a pair of capstans each positioned to engage the tape, and a belt coupling both capstans to said motor to effect longitudinal tape displacement responsive to rotation of said motor, a latching relay connected to pass electrical energy to said motor and to reverse the polarity of motor energization, responsive to receipt of a control signal, to reverse the motor rotation and thus reverse the direction of tape displacement, a pair of end-of-tape sensors, spaced apart and positioned adjacent different portions of the tape path, such that each sensor passes a control signal to said latching relay when the tape is nearly exhausted, a tape guide chute having a pair of walls for restraining lateral tape movement, which walls are spaced apart by a distance substantially equal to said predetermined tape width plus the distance between the first and second tape tracks, and a pair of canted roller bearings disposed at spacedpart locations each of which is adjacent the tape path, each roller bearing defining a roller surface which engages the tape as the tape is longitudinally displaced, each roller surface being canted at an angle with respect to the direction of longitudinal tape movement such that the tape is held adjacent one wall of the tape guide chute as the tape is moved in a first longitudinal direction, and the tape is laterally displaced against the other wall of the tape guide chute when the tape is placed in the opposite longitudinal direction, to effect and maintain automatic tape shifting between tracks by the canted roller bearings.

References Cited

UNITED STATES PATENTS

| | | | |
|---|---|---|---|
| 2,669,454 | 2/1954 | Babicz | 271—49 |
| 2,888,261 | 5/1959 | Barnes | 271—49 |

ALLEN N. KNOWLES, Primary Examiner

U.S. Cl. X.R.

226—50, 110, 196; 271—59